US012041280B2

(12) United States Patent
Chan et al.

(10) Patent No.: US 12,041,280 B2
(45) Date of Patent: Jul. 16, 2024

(54) METHODS, SYSTEMS, AND MEDIA FOR PROVIDING DYNAMIC MEDIA SESSIONS WITH VIDEO STREAM TRANSFER FEATURES

(71) Applicant: Google LLC, Mountain View, CA (US)

(72) Inventors: Christopher Chan, San Francisco, CA (US); Kenneth J. MacKay, Mountain View, CA (US); Allan Mills, San Francisco, CA (US); Yanchao Wang, Sunnyvale, CA (US); James Carroll West, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/007,142

(22) Filed: Aug. 31, 2020

(65) Prior Publication Data
US 2021/0185365 A1    Jun. 17, 2021

Related U.S. Application Data

(60) Provisional application No. 62/946,704, filed on Dec. 11, 2019.

(51) Int. Cl.
*H04N 21/2387* (2011.01)
*G06F 3/16* (2006.01)
*H04N 21/239* (2011.01)
*H04N 21/431* (2011.01)
*H04N 21/436* (2011.01)
*H04N 21/437* (2011.01)
(Continued)

(52) U.S. Cl.
CPC ........ *H04N 21/2387* (2013.01); *G06F 3/167* (2013.01); *H04N 21/2393* (2013.01); *H04N 21/4312* (2013.01); *H04N 21/436* (2013.01); *H04N 21/437* (2013.01); *H04N 21/44* (2013.01); *H04N 21/47217* (2013.01)

(58) Field of Classification Search
CPC .............. H04N 21/234; H04N 21/235; H04N 21/40–60
See application file for complete search history.

(56) References Cited

U.S. PATENT DOCUMENTS 9,489,070 B2 * 11/2016 Miyazaki .............. G06F 3/0482
10,762,928 B1 *  9/2020 Camus ............. H04N 21/42201
(Continued)

*Primary Examiner* — Mushfikh I Alam
(74) *Attorney, Agent, or Firm* — Kilpatrick Townsend & Stockton LLP

(57) ABSTRACT

Methods, systems, and media for providing dynamic media sessions with video stream transfer features are provided. In some embodiments, the methods include: receiving an indication that presentation of the video content item is to be transferred from the first display device to a different display device; in response to receiving the indication, determining whether the first display device supports transferring the presentation of the video content item and determining whether the different display device is capable of presenting the video content item; and transmitting an indication that presentation of the video content item is to be transferred from the first display device to the different display device, wherein the video content item is played back using the different display device from a playback position that is based on the playback state from the first display device.

19 Claims, 5 Drawing Sheets

(51) Int. Cl.
*H04N 21/44* (2011.01)
*H04N 21/472* (2011.01)

(56) References Cited

U.S. PATENT DOCUMENTS

| | | | |
|---|---|---|---|
| 2012/0254793 A1* | 10/2012 | Briand | H04N 21/43615 |
| | | | 715/781 |
| 2015/0178227 A1* | 6/2015 | Salmela | H04N 21/41407 |
| | | | 710/72 |
| 2017/0013331 A1* | 1/2017 | Watanabe | H04L 12/282 |
| 2017/0026686 A1* | 1/2017 | Glazier | H04N 21/4438 |
| 2017/0238031 A1* | 8/2017 | Warrick | H04N 21/2543 |
| | | | 725/5 |
| 2017/0289614 A1* | 10/2017 | VanBlon | H04N 21/42201 |
| 2018/0324684 A1* | 11/2018 | Onohara | H04N 21/4363 |
| 2019/0132639 A1* | 5/2019 | Panchaksharaiah | H04N 21/47217 |
| 2020/0195994 A1* | 6/2020 | Eluvan | H04N 21/25825 |
| 2020/0314481 A1* | 10/2020 | Gupta | H04N 21/436 |
| 2021/0092176 A1* | 3/2021 | Schneider | H04N 21/4333 |
| 2021/0329310 A1* | 10/2021 | Wilson | H04N 21/252 |

\* cited by examiner

METHODS, SYSTEMS, AND MEDIA FOR PROVIDING DYNAMIC MEDIA SESSIONS WITH VIDEO STREAM TRANSFER FEATURES

CROSS-REFERENCE TO RELATED APPLICATION

This application claims the benefit of U.S. Provisional Patent Application No. 62/946,704, filed Dec. 11, 2019, which is hereby incorporated herein in its entirety.

TECHNICAL FIELD

The disclosed subject matter relates to methods, systems, and media for providing dynamic media sessions with video stream transfer features.

BACKGROUND

With the increase in networked media devices, users may generally be interested in transferring a presentation of video content from one device to another, for example, as they move around their home. For example, a user may want to begin watching a video content item on a first display device (e.g., a living room television) and then transfer playback of the video content item to a second display device (e.g., a kitchen display device) as they move into a room with the second display device. However, it can be difficult to transfer video content from one device to another. For example, it can be difficult for a user to start the same content on the new device, and for the user to remember the point at which the user left off.

Accordingly, it is desirable to provide new methods, systems, and media for providing dynamic media sessions with video stream transfer features.

SUMMARY

Methods, systems, and media for providing dynamic media sessions with video stream transfer features are provided.

In accordance with some embodiments of the disclosed subject matter, a method for media playback is provided, the method comprising: causing, by a user device, a video content item to begin being presented on a first display device; receiving, at the user device, an indication that presentation of the video content item is to be transferred from the first display device to a different display device; determining that the first display device supports transferring the presentation of the video content item; determining that the different display device is capable of presenting the video content item; transmitting, from the user device to a server, an indication that presentation of the video content item is to be transferred from the first display device to the different display device based on the determination that the first display device supports transferring the presentation of the video content item and the determination that the different display device is capable of presenting the video content item; requesting, by the server, a playback state from the first display device; and transmitting, by the server to the different display device, the playback state to the different display device in connection with an instruction to begin presenting the video content item from a playback position that is based on the playback state.

In some embodiments, the method further comprises presenting a second user interface on the user device during presentation of the video content item on the first display device for controlling playback of the video content item on the first display device.

In some embodiments, the method further comprises presenting the second user interface on the user device during presentation of the video content item on the selected display device, wherein the second user interface is updated to indicate an identity of the selected display device.

In some embodiments, the second user interface includes a selectable icon that, when selected, causes the user interface that indicates display devices included in the group of available display devices to be presented on the user device.

In some embodiments, the selected display device is the user device.

In some embodiments, the method further comprises initializing, on the user device, a media playback application for presenting the video content item in response to receiving the selection of the display device.

In some embodiments, a first instance of a media playback application is executing on the first display device.

In some embodiments, the method further comprises determining whether the media playback application is capable of transferring the video content item from the first display device to a different display device.

In some embodiments, the server causes the second display device to execute a second instance of the media playback application, and wherein the second instance of the media playback application receives the playback state for resuming playback of the video content item.

In some embodiments, the method further comprises determining whether the first display device is capable of being removed from presenting the video content item.

In accordance with some embodiments of the disclosed subject matter, a system for media playback is provided, the system comprising a hardware processor that: causes, by a user device, a video content item to begin being presented on a first display device; receives, at the user device, an indication that presentation of the video content item is to be transferred from the first display device to a different display device; determines that the first display device supports transferring the presentation of the video content item; determines that the different display device is capable of presenting the video content item; transmits, from the user device to a server, an indication that presentation of the video content item is to be transferred from the first display device to the different display device based on the determination that the first display device supports transferring the presentation of the video content item and the determination that the different display device is capable of presenting the video content item; requests, by the server, a playback state from the first display device; and transmits, by the server to the different display device, the playback state to the different display device in connection with an instruction to begin presenting the video content item from a playback position that is based on the playback state.

In accordance with some embodiments of the disclosed subject matter, a non-transitory computer-readable medium containing computer executable instructions that, when executed by a processor, cause the processor to perform a method for media playback is provided, the method comprising: causing, by a user device, a video content item to begin being presented on a first display device; receiving, at the user device, an indication that presentation of the video content item is to be transferred from the first display device to a different display device; determining that the first display device supports transferring the presentation of the video content item; determining that the different display device is capable of presenting the video content item; transmitting, from the user device to a server, an indication that presentation of the video content item is to be transferred from the first display device to the different display device based on the determination that the first display device supports transferring the presentation of the video content item and the determination that the different display device is capable of presenting the video content item; requesting, by the server, a playback state from the first display device; and transmitting, by the server to the different display device, the playback state to the different display device in connection with an instruction to begin presenting the video content item from a playback position that is based on the playback state.

In accordance with some embodiments of the disclosed subject matter, a system for media playback is provided, the system comprising: means for causing, by a user device, a video content item to begin being presented on a first display device; means for receiving, at the user device, an indication that presentation of the video content item is to be transferred from the first display device to a different display device; means for determining that the first display device supports transferring the presentation of the video content item; means for determining that the different display device is capable of presenting the video content item; means for transmitting, from the user device to a server, an indication that presentation of the video content item is to be transferred from the first display device to the different display device based on the determination that the first display device supports transferring the presentation of the video content item and the determination that the different display device is capable of presenting the video content item; means for requesting, by the server, a playback state from the first display device; and means for transmitting, by the server to the different display device, the playback state to the different display device in connection with an instruction to begin presenting the video content item from a playback position that is based on the playback state.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
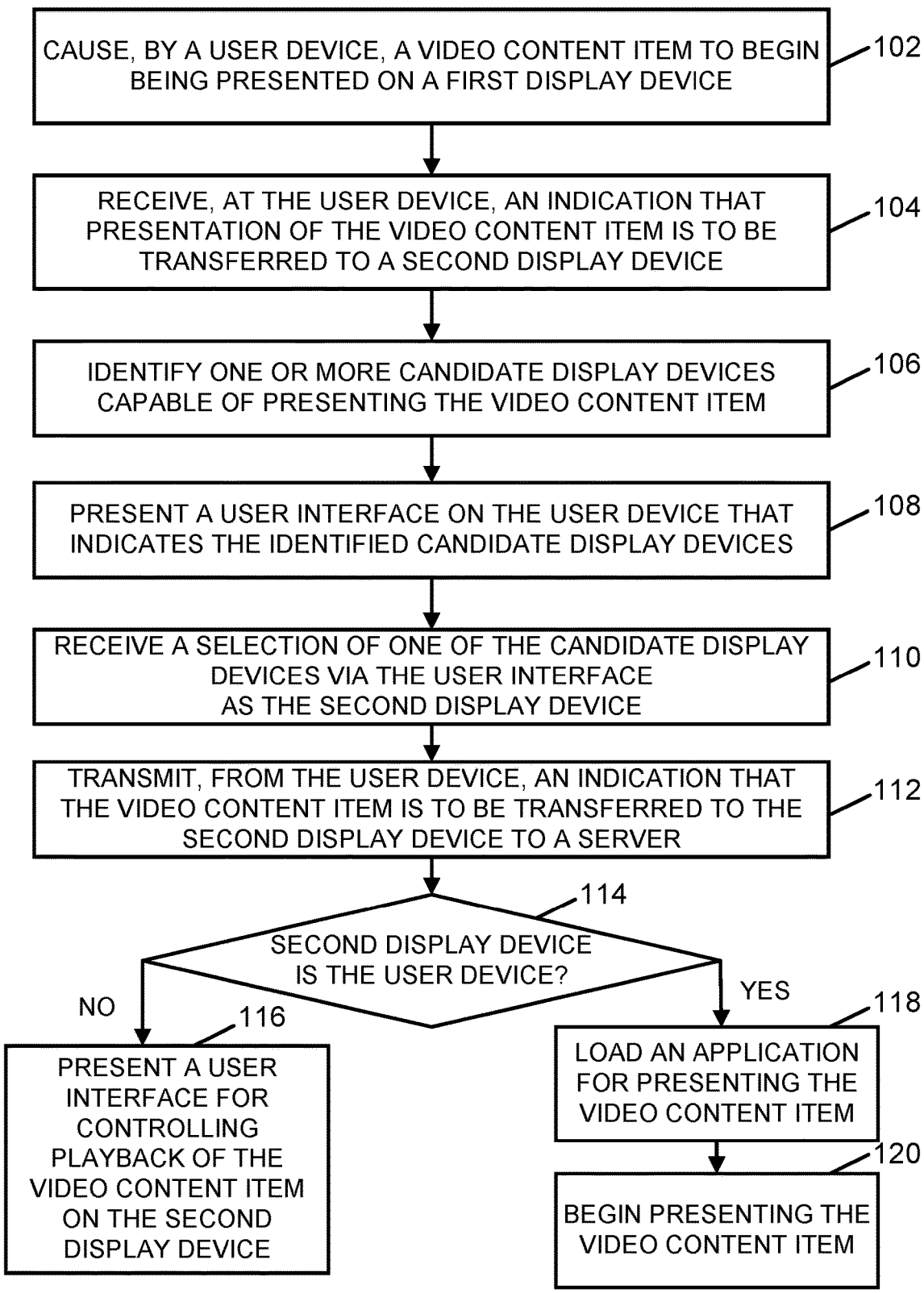
FIG. 1 shows an illustrative example of a process for transferring presentation of a video content item from a first display device to a second display device in accordance with some embodiments of the disclosed subject matter.

In accordance with various embodiments, mechanisms (which can include methods, systems, and media) for providing dynamic media sessions with video stream transfer features are provided.

In some embodiments, the mechanisms described herein can be used to transfer presentation of a video content item from a first display device to a second display device. In some embodiments, the first display device and the second display device can be any suitable type(s) of devices capable of presenting video content, such as a television, a smart television, a display connected to a streaming media device, a game console, a vehicle entertainment system, a mobile device (e.g., a mobile phone, a wearable computer, a tablet computer, a laptop computer, a desktop computer, and/or any other suitable mobile device), a virtual assistant device with a screen, and/or any other suitable type of display device.

In some embodiments, the mechanisms can cause presentation of the video content item to be transferred from the first display device to the second display device in response to any suitable information. For example, in some embodiments, a user device (e.g., a mobile phone, a virtual assistant device, a tablet computer, a wearable computer, and/or any other suitable device) that is used to control presentation of the video content item on the first display device can receive an indication that presentation of the video content item is to be transferred to the second display device. As a more particular example, in some embodiments, the user device can receive the indication via one or more user interfaces, as shown in and described below in more detail in connection with FIGS. 1, 2A, and 2B.

In some embodiments, the mechanisms described herein can identify available display devices and can present the identified display devices for selection by a user. For example, in some embodiments, available display devices (e.g., "bedroom television," "den television," "kitchen smart display," etc.) can be identified and can be presented as available display devices to which presentation of a video content item can be transferred. In some embodiments, available display devices can be identified and presented for selection by a user in any suitable manner, as shown in and described below in connection with FIGS. 1, 2A, and 2B.

In some embodiments, the mechanisms described herein can transfer playback of the video content item from the first display device to the second display device in any suitable manner. For example, as described below in more detail in connection with FIGS. 1 and 3, in some embodiments, transfer of playback of the video content item can be performed using a server associated with a media content casting service. In such embodiments, the server can store information associated with a media playback session on one or more display devices. In some embodiments, the server can transfer playback of the video content item that is being presented as part of a media playback session from a first display device to a second display device in any suitable manner. For example, in some embodiments, the server can transmit an instruction to the first display device to stop presenting the video content item in connection with a request for the first display device to return, to the server, a current playback state that includes a playback position at which presentation of the video content item on the first display device is stopped. Continuing with this example, in some embodiments, the server can then transmit, to the second display device, an indication of the current playback state in connection with instructions that cause the second display device to begin presenting the video content item from a playback position that is determined based on the playback position included in the current playback state. Accordingly, the second display device can resume playback of the video content item using an instance of a media playback application based on the current playback state of the first display device.

Turning to FIG. 1, an illustrative example 100 of a process for providing dynamic media sessions with video stream transfer features is shown in accordance with some embodiments of the disclosed subject matter. In some embodiments, blocks of process 100 can be executed by a user device from which presentation of media content on different media presentation devices (e.g., different display devices, different speakers, and/or any other suitable media presentation devices) can be controlled. For example, in some embodiments, the user device can be a mobile phone, a tablet computer, a wearable computer, a laptop computer, a desktop computer, a virtual assistant device, and/or any other suitable type of user device.

At 102 of process 100, the user device can cause a video content item to begin being presented on a first display device. In some embodiments, the first display device can be any suitable type of media presentation device that is capable of presenting video content, such as a smart television, a television coupled to a streaming media device that receives instructions from the user device, a game console, a virtual assistant device with a screen, and/or any other suitable display device. In some embodiments, the user device can communicate with the first display device in any suitable manner. For example, in some embodiments, the user device and the first display device can transmit and receive messages via a Wi-Fi network the user device and the first display device are both connected to. As another example, in some embodiments, the user device and the first display device can communicate via a BLUETOOTH network.

In some embodiments, the user device can cause the video content item to begin being presented on the first display device in any suitable manner. For example, in some embodiments, the user device can transmit a link to the video content item to the first display device that instructs the first display device to request or retrieve video content associated with the link and begin presenting the video content. Note that, in some embodiments, the video content item can be any suitable type of video content item (e.g., a video, a music video, a movie, a television show, live-streamed video content, and/or any other suitable type of video content item). In some embodiments, the video content item can be a video content item that is stored on a server (e.g., a server associated with a video sharing service, a server associated with a social networking service, and/or any other suitable server) that is streamed from the server by the first display device.

Note that, in some embodiments, the first display device can present the video content item using any suitable application that is executing on the first display device. For example, in some embodiments, the first display device can present the video content item using an application associated with a video sharing service, where the application causes a video player window in which the video content is played back to be presented on the first display device. In some embodiments, the first display device can initialize such an application in response to receiving an instruction from the user device.

Figure 2A:
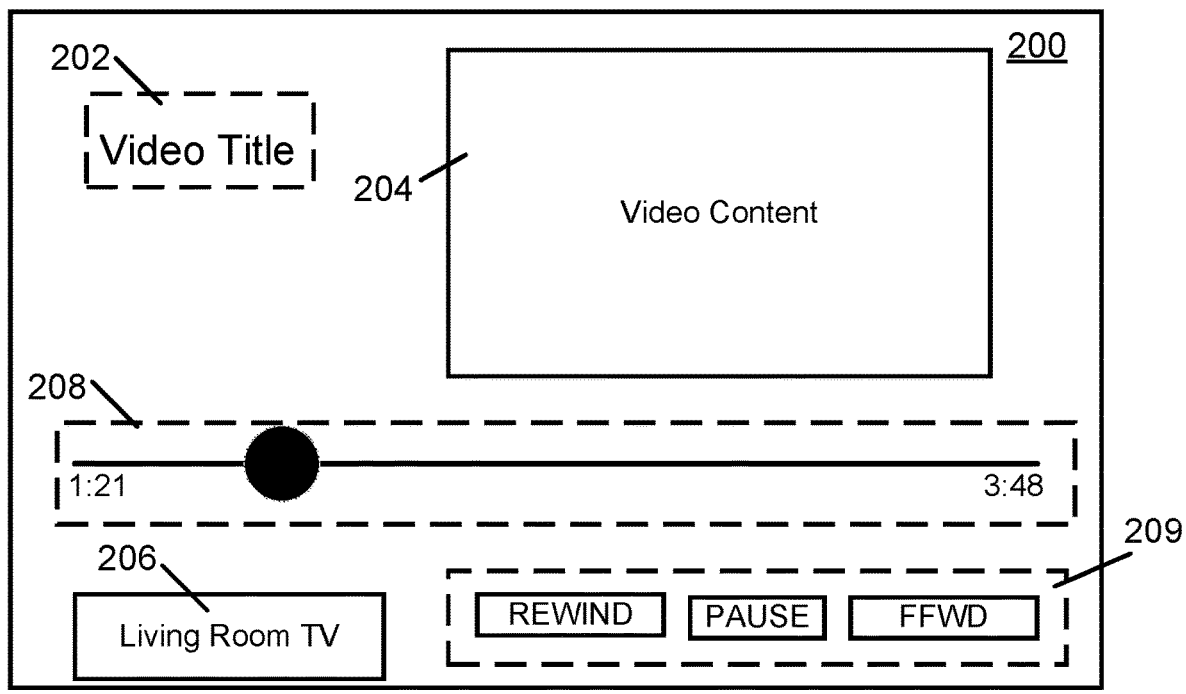
FIGS. 2A and 2B show examples of user interfaces for identifying and selecting display devices in accordance with some embodiments of the disclosed subject matter.

In some embodiments, the user device can present a user interface that allows a user of the user device to control presentation of the video content item on the first display device. Turning to FIG. 2A, an illustrative example 200 of a user interface for controlling and interacting with presentation of the video content item is shown in accordance with some embodiments of the disclosed subject matter. As illustrated, in some embodiments, user interface 200 can include video information 202, video content 204, a display device indicator 206, a video playback indicator 208, and/or playback controls 209.

In some embodiments, video information 202 can indicate a title of the video content item, such as shown in FIG. 2A. In some embodiments, video information 202 can include any other suitable information about the video content item, such as a channel to which the video content item was uploaded and/or is otherwise associated, a name of a creator of the video content item, a date associated with the video content item (e.g., a date the video content item was created, a date the video content item was uploaded to a video sharing service or other service, and/or any other suitable date), and/or any other suitable information.

In some embodiments, video content 204 can include any suitable images associated with the video content item. For example, in some embodiments, video content 204 can include a thumbnail image that represents the video content item being presented on the first display device.

In some embodiments, display device indicator 206 can include any suitable information, such as a name of the first display device (e.g., "living room TV," "mobile phone," "bedroom TV," and/or any other suitable name). In some embodiments, display device indicator 206 can include any suitable icon(s) that indicates any suitable information, such as a type of device associated with the first display device (e.g., that the first display device is a television, that the first display device is a game console, and/or any other suitable device type information), an indication of an owner of the first display device (e.g., an icon that includes an initial of the owner, an image that includes a profile photo of the owner, and/or any other suitable owner indication), and/or any other suitable information. Note that, in some embodiments, display device indicator 206 can be selectable. In such embodiments, in response to determining that display device indicator 206 has been selected, the user device can present a user interface that allows a different display device to be selected to transfer content to the selected display device, as shown in and described below in connection with FIG. 2B and blocks 104-108 of FIG. 1.

In some embodiments, video playback indicator 208 can indicate a duration of the video content item and/or how much of the video content item has elapsed at a current time, as shown in FIG. 2A.

In some embodiments, user interface 200 can include playback controls 209 that can be used to modify playback of the video content item. As a more particular example, in some embodiments, as shown in FIG. 2A, user interface 200 can include a rewind button, a pause button, and/or a fast-forward button. In some embodiments, user interface 200 can additionally or alternatively include volume controls that can be used to adjust a volume of audio content associated with the video content item.

Referring back to FIG. 1, at 104 of process 100, the user device can receive an indication that presentation of the video content item is to be transferred to a second display device. In some embodiments, the user device can receive the indication in any suitable manner. For example, in some embodiments, the user device can receive the indication via a user interface, such as user interface 200 as shown in and described above in connection with FIG. 2A. As a more particular example, in some embodiments, the user device can receive the indication in response to determining that display device indicator 206 as shown in FIG. 2A has been selected. As another more particular example, in some embodiments, user interface 200 can include a selectable icon that, when selected, indicates that presentation of the video content item is to be transferred to a different display device.

It should be noted that, in some embodiments, the user device can determine whether the video content item can be transferred to a second display device. For example, the user device can determine whether the video content item is associated with a particular type of content and, in response to determining that the video content item is associated with a particular type of content (e.g., movie content, subscription-based content, premium content, content associated with a particular type of media service, etc.), the user device can proceed to 106 of process 100. In another example, the user device can determine whether the video content item is being presented using a media playback application that is capable of supporting the transfer of the video content item to the second display device. In a more particular example, the user device can determine whether the media playback application used to present the video content item on the user device supports stream transfer of the video content item and the user device can determine whether the user device can be removed as the device that presents the video content item. Accordingly, in response to the user determining that the video content item cannot be transferred to the second display device, the user device can prevent the video content item from being transferred.

At 106 of process 100, the user device can identify one or more candidate display devices capable of presenting the video content item. In some embodiments, the user device can identify the one or more candidate display devices in any suitable manner and using any suitable technique(s). For example, in some embodiments, the user device can use any suitable device discovery protocol to identify the one or more candidate display devices connected to a same communication network that the user device is connected to, such as a local Wi-Fi network in a home of a user of the user device, and/or any other suitable communication network. As a more particular example, in some embodiments, the user device can identify the one or more candidate display devices via mDNS, Discovery and Launch (DIAL), and/or using any other suitable protocol(s). Note that, in some embodiments, an identified display device can be connected to a Wi-Fi network directly or via a streaming media interface that is connected (e.g., via an HDMI connection, and/or connected in any other suitable manner) to the display device.

In some embodiments, the user device can identify one or more display devices using any suitable device discovery protocol and can subsequently determine whether each of the discovered display devices is capable of receiving a transfer of presentation of the video content item. In some embodiments, the user device can determine whether each identified display device is capable of being a candidate display device based on any suitable information, such as based on a type of device of the identified display device, a capability of the identified display device, subscription information, and/or any other suitable information, as described in more detail below.

In some embodiments, the user device can identify any suitable information about each of the one or more identified display devices. For example, in some embodiments, the user device can determine a type of device associated with each of the identified display devices. As a more particular example, in some embodiments, the type of device can indicate that the identified display device is a television, that the identified display device is a streaming media device connected to a television, that the identified display device is a virtual assistant device with a screen, and/or any other suitable type of device. As another example, in some embodiments, the user device can determine a capability of each of the identified display devices. As a more particular example, in some embodiments, the user device can determine whether each identified display device is capable of receiving instructions from the user device and/or from a server associated with a media casting session (e.g., instructions to initialize a particular application for presenting video content, instructions that include a playback position, and/or any other suitable instructions). As another more particular example, in some embodiments, the user device can determine whether each identified display device is updated with a particular version of an application to be used for presenting the video content item. As yet another example, in some embodiments, the user device can identify a model number of each identified display device.

In some embodiments, the user device can determine a proximity of each identified display device to the user device. For example, in some embodiments, the user device can determine that a first identified device (e.g., a bedroom television) is closer to the user device than a second identified device (e.g., a kitchen smart display).

In some embodiments, the user device can additionally determine whether a user of the user device has purchased a particular subscription with a service used for playing, downloading, or streaming the video content item. For example, in some embodiments, the user device can determine whether the user has purchased a premium subscription that allows the user to transfer presentation of a video content item from one display device to another. In some embodiments, the user device can determine whether the user has purchased a particular type or level of subscription in any suitable manner. For example, in some embodiments, the user device can transmit a query to a server associated with a service that provides the video content item, where the query requests account information corresponding to a user account of the user. Note that, in some embodiments, the user device can store account information that indicates whether the user has purchased a particular subscription or a particular level of subscription to the service.

In some embodiments, the user device can then determine whether each identified display device is capable of being included in the candidate display devices based on the information associated with each identified display device (e.g., device type information, capability information, and/or any other suitable device information) and/or the subscription information. For example, in some embodiments, the user device can determine that an identified display device that is not updated with a particular version of a particular application is not to be included in the candidate display devices. As another example, in some embodiments, the user device can determine that none of the identified display devices are to be included in the candidate display devices in response to determining that the user has not purchased a particular subscription or level of subscription.

Figure 2B:
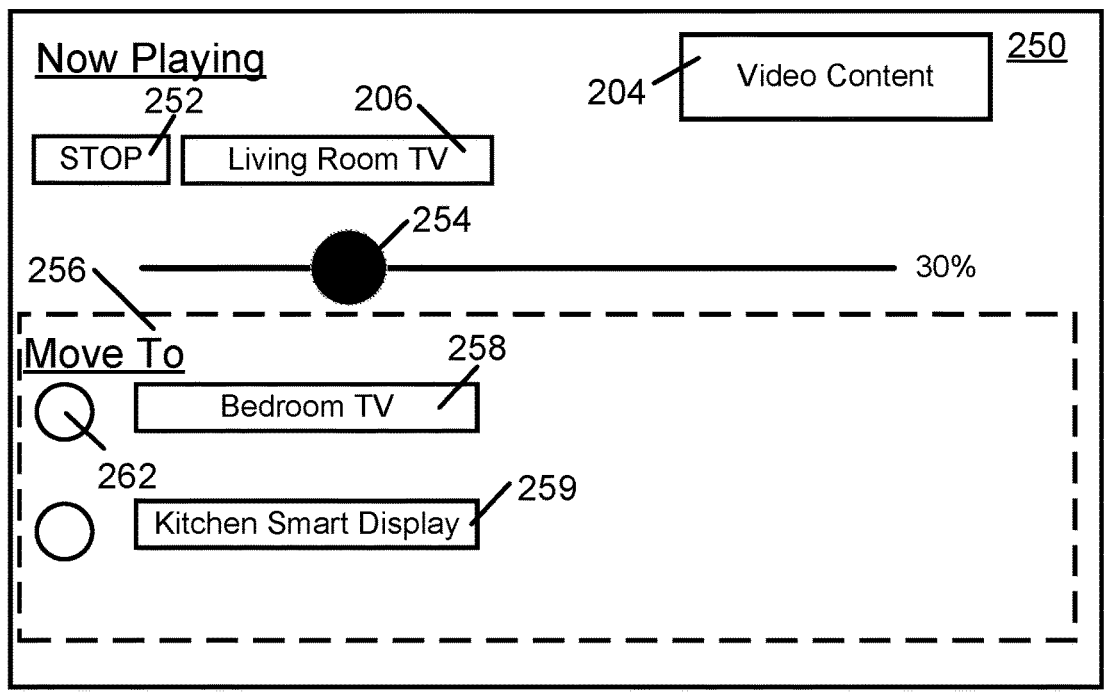

At 108 of process 100, the user device can present a user interface that indicates the identified candidate display devices. Turning to FIG. 2B, an example 250 of a user interface that indicates candidate display devices is shown in accordance with some embodiments of the disclosed subject matter. As illustrated, in some embodiments, user interface 250 can include a stop presentation button 252, a volume indicator 254, and a group of identified candidate display devices 256.

In some embodiments, stop presentation button 252 can, in response to being selected, cause presentation of the video content item to stop on the first display device. Note that, in some embodiments, stop presentation button 252 can be omitted.

In some embodiments, volume indicator 254 can indicate a current volume of audio content associated with the video content item being presented by the first display device. For example, as shown in FIG. 2B, volume indicator 254 can include a percentage that indicates a current volume relative to a maximum volume possible by the first display device. Additionally, as shown in FIG. 2B, volume indicator 254 can include a slider that can be used to adjust a volume of the audio content on the first display device.

In some embodiments, group of identified candidate display devices 256 can include any of the one or more display devices identified as described above in connection with block 106. For example, as shown in FIG. 2B, group of identified candidate display devices 256 can include a bedroom television 258 and a kitchen smart display 259. Note that, although two candidate display devices are shown in group of identified candidate display devices 256, in some embodiments, any suitable number (e.g., one, two, five, ten, and/or any other suitable number) of display devices can be indicated.

Note that, in some embodiments, any suitable error message can be presented in place of group of identified candidate display devices 256 or in connection with a particular display device. For example, in some embodiments, in an instance in which no candidate display devices have been identified at block 106, an error message can be presented that indicates that no display devices were found. As another example, in some embodiments, in an instance in which the user device determined that a user of the user device has not purchased a particular type of subscription that is required for transferring presentation of a video content item, an error message that indicates that purchase of a subscription is required can be presented. In such embodiments, the error message can include a link that, when selected, causes the user device to navigate to a page for purchasing a subscription to the service. As yet another example, in some embodiments, in an instance in which a particular display device has been identified by the user device, and in which it has been determined that the particular display device is not to be included as a candidate display device because the user of the user device has not purchased a particular subscription or level of subscription, the identified display device can be included in group of identified candidate display devices 256 in a manner that indicates that the display device has been identified but is not currently available for transfer of a presentation of video content. As a more particular example, in some embodiments, the identified display device can be listed in group of identified candidate display devices 256 with the name or identifier of the identified display device grayed out and/or presented in any other suitable visual manner that indicates that the display device is not currently available as a display device. Note that, in some embodiments, such an identified display device can be presented in connection with a link that, in response to being selected, can cause the user device to navigate to a page for purchasing the subscription or the level of subscription required to include the identified device as available for transfer of a presentation of video content.

In some embodiments, each display device in group of identified candidate display devices 256 can be associated with a selection button, such as selection button 262. In some embodiments, selection of selection button 262 can cause the corresponding display device to be identified by the user device as a selected display device, as described below in connection with block 110 of FIG. 1. Note that, in some embodiments, selection buttons associated with each candidate display button can be a radio button or similar user interface control that allows only one candidate display device to be selected from group of identified candidate display devices 256.

Note that, in some embodiments, the display devices included in the group of identified candidate display devices can be presented in any suitable order. For example, in some embodiments, the display devices can be presented in alphabetical order. As another example, in some embodiments, the display devices can be presented in order of proximity to the user device. As a more particular example, in some embodiments, candidate display devices that are determined to be closer to the user device can be presented in a higher position within group of identified candidate display devices 256.

Referring back to FIG. 1, note that, although the indication that presentation of the video content item is to be transferred to a second display device (e.g., as described above in connection with block 104 of FIG. 1) and selection of the second display device (e.g., as described above in connection with FIG. 2B) are described as received via user interfaces, in some embodiments, the indication that presentation of the video content item is to be transferred to a different display device and selection of the second display device can be received by the user device via a spoken command received using a microphone of the user device. For example, in some embodiments, the indication that presentation of the video content item is to be transferred to a second display device can be received by the user device in response to the user device detecting that particular trigger words have been received by the user device, such as "move to," "play this on," and/or any other suitable trigger word(s). As another example, in some embodiments, selection of the second display device can be received by the user device when the user device detects that an identifier of the second display device has been spoken, such as "bedroom television," "kitchen smart display," and/or any other suitable display device identifier(s).

Referring back to FIG. 1, in some embodiments, at 110 of process 100, the user device can receive a selection of one of the display devices via the user interface as the second display device. For example, in some embodiments, the user device can determine that a selection button corresponding to a particular candidate display device has been selected, as shown in and described above in connection with FIG. 2B.

At 112 of process 100, the user device can transmit, to a server, an indication that presentation of the video content item is to be transferred to the selected second display device. In some embodiments, the server can be any suitable server. For example, in some embodiments, the server can be associated with a media casting session service that stores any suitable information associated with a casted media playback session in which the video content item is currently being presented by the first display device, as described in more detail in connection with FIGS. 3 and 4. In some embodiments, the user device can transmit any suitable information to the server, such as an identifier of the second display device, an identifier of the video content item that is being presented by the first display device, an identifier of the first display device, and/or any other suitable information.

Note that, in some embodiments, in response to receiving the indication from the user device, the server can perform any suitable actions that transfer presentation of the video content item to the second display device, as shown in and described below in connection with FIG. 3. Additionally, note that, in some embodiments, the server can cause the first display device to stop presentation of the video content item at a particular playback position, as described below in more detail in connection with FIG. 3.

At 114 of process 100, the user device can determine whether the selected second display device is the user device itself.

If, at 114, the user device determines that the selected second display device is not the user device itself ("no" at 114), the user device can, at 116 of process 100, present a user interface for controlling playback of the video content item on the second display device. In some embodiments, the user interface can be similar to user interface 200 as shown in and described above in connection with FIG. 2A. In some embodiments, the user interface can include any suitable user interface controls for modifying playback of the video content item on the second display device, such as a rewind button, a pause button, a fast-forward button, and/or any other suitable user interface controls, as shown in and described above in connection with FIG. 2A. In some embodiments, the user interface can include an indication of the second display device.

If, at 114, the user device determines that the second display device is the user device itself ("yes" at 114), the user device can, at 118 of process 100, load an application for presenting the video content item. In some embodiments, the application can be any suitable application. For example, in some embodiments, the application can be associated with a video sharing service that provides the video content item being presented.

At 120 of process 100, the user device can begin presenting the video content item. In some embodiments, the user device can begin presenting the video content item from a playback position corresponding to a time point at which the first display device stopped presentation of the video content item. Note that, in some embodiments, the user device can begin presenting the video content item using any suitable technique(s). For example, as described below in more detail in connection with FIG. 3, in some embodiments, the user device, functioning as the selected second display device, can receive, from the server, information associated with the media playback session. As a more particular example, in some embodiments, the information associated with the media playback session can include an identifier of the video content item being presented and an indication of a playback position from which the user device is to begin presenting the video content item. Continuing with this example, in some embodiments, the user device can then begin presenting the video content item from the indicated playback position in any suitable manner. For example, in some embodiments, the user device can request that a server that hosts the video content item begin streaming the video content item to the user device from the indicated playback position. Note that, in such embodiments, the server that hosts the video content item can be different than or the same as the server that coordinates transfer of playback of the video content item between the first display device and the second display device.

It should be noted that, in some embodiments in which the second display device is a leader device of a group of devices including one or more follower devices, the second display device can receive information associated with the media playback session, such as an identifier of the video content item being presented and an indication of a playback position from which the second display device is to begin presenting the video content item, and can transmit instructions to each of the follower devices that cause the follower devices to present audio content associated with the video content item synchronously with the second display device.

Figure 3:
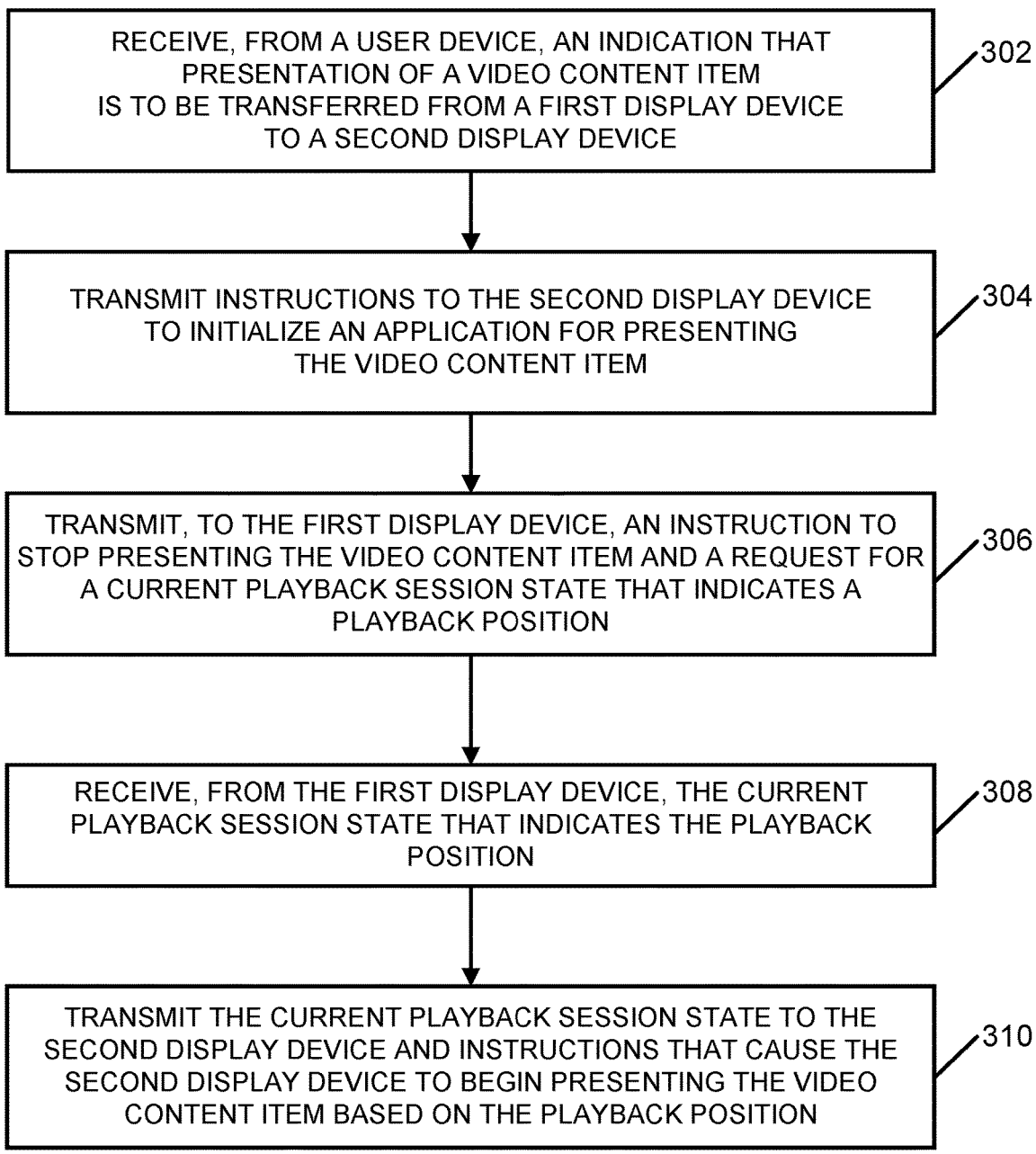
FIG. 3 shows an illustrative example of a process for transferring presentation of a video content item from a first display device to a second display device in accordance with some embodiments of the disclosed subject matter.

Turning to FIG. 3, an example 300 of a process for transferring presentation of a video content item from a first display device to a second display device is shown in accordance with some embodiments of the disclosed subject matter. In some embodiments, blocks of process 300 can be executed by a server, such as a server that stores information associated with casted media playback sessions.

At 302 of process 300, the server can receive, from a user device, an indication that presentation of a video content item is to be transferred from a first display device to a second display device. As described above in connection with FIG. 1, in some embodiments, the video content item can be any suitable type of video content, such as a television show, a movie, a video, live-streamed video content, a video in a playlist of videos, and/or any other suitable type of video content item. As described above in connection with FIG. 1, the user device can be any suitable type of user device that can be used to control presentation of the video content item, such as a mobile phone, a wearable computer, a tablet computer, a virtual assistant device, a laptop computer, a desktop computer, and/or any other suitable type of device. As described above in connection with FIG. 1, the first display device and the second display device can be any suitable type(s) of display devices capable of presenting the video content item, such as a television, a smart television, a television or other display connected to a streaming media device, a game console, a virtual assistant device that has a display, a mobile device (e.g., a mobile phone, a tablet computer, a laptop computer, and/or any other suitable type of mobile device), a vehicle entertainment system, and/or any other suitable type of display device.

In some embodiments, the indication can include any suitable information. For example, in some embodiments, the indication can include identifiers of the first display device and/or the second display device. As a more particular example, in some embodiments, the identifiers can include any suitable identifying information, such as network information associated with the first display device and/or the second display device (e.g., IP addresses, port information, MAC addresses, and/or any other suitable network information), a make or model of the first display device and/or the second display device, and/or any other suitable identifying information. As another example, in some embodiments, the indication can include an identifier of a media playback session associated with presentation of the video content item. As yet another example, in some embodiments, the indication can include an identifier of the video content item (e.g., a URL at which the video content item is located, a name of the video content item, and/or any other suitable identifying information).

At 304 of process 300, the server can transmit instructions to the second display device to initialize an application for presenting the video content item. In some embodiments, the application can be any suitable application. For example, in some embodiments, the application can be associated with a particular video sharing service, a particular media content presentation service, a particular social networking service, and/or any other suitable application. In some embodiments, the application can cause video content to be presented on a device executing the application, for example, in a video player window presented within a user interface of the application. In some embodiments, the application can be an application that can manage presentation of the video content item on the second display device in any suitable manner. For example, in some embodiments, the application can control a video pipeline used to present video content on a display of the second display device. As another example, in some embodiments, the application can control an audio pipeline used to present audio content associated with the video content item using speakers associated with the second display device. Note that, in some embodiments, an instance of the application can be currently executing on the first display device in connection with presentation of the video content item on the first display device.

At 306 of process 300, the server can transmit, to the first display device, an instruction to stop presentation of the video content item and a request for a current playback session state that indicates a playback position at which presentation of the video content item was stopped on the first display device. In some embodiments, the instruction to stop presentation of the video content item can include any suitable instructions or commands. For example, in some embodiments, the instruction can include commands to stop presenting video content and audio content associated with the video content item by the first display device. As another example, in some embodiments, the instruction can include commands to relinquish any suitable resources used by the first display device, such as screen resources, audio presentation resources, and/or any other suitable resources. As yet another example, in some embodiments, the instruction can include commands to close or stop execution of an application executing on the first display device for presentation of the video content item.

At 308 of process 300, the server can receive, from the first display device, the current playback session state in response to the request. In some embodiments, the current playback session state can include any suitable information, such as an indication of a playback position at which presentation of the video content item was stopped on the first display device. For example, in some embodiments, the playback position can indicate a time point of the video content item at which presentation of the video content item was stopped on the first display device. As another example, in some embodiments, the playback position can indicate a last frame of the video content item that was presented by the first display device prior to stopping presentation of the video content item on the first display device. Additionally, in some embodiments, the server can receive, from the first display device, a content URL associated with the video content item, a current time or playback position of the video content item being played back on the first display device, a queue structure, user credentials associated with the media playback application used to present the video content item, etc.

At 310 of process 300, the server can transmit the current playback session state to the second display device in connection with instructions that cause the second display device to begin presenting the video content item based on the playback position included in the current playback session state. In some embodiments, the instructions can cause the second display device to begin presenting the video content item based on the playback position in any suitable manner. For example, in some embodiments, the instructions can cause the second display device to begin presenting the video content item at a playback position subsequent to the playback position included in the current playback session state. As a more particular example, in some embodiments, the instructions can cause the second display device to begin presenting the video content item from a frame subsequent to a last frame that was presented by the first display device. As another more particular example, in some embodiments, the instructions can cause the second display device to load a media playback application and resume the presentation of the video content item using the media playback application having the same application identifier and at a current playback position based on the current playback session state. As another example, in some embodiments, the instructions can cause the second display device to begin presenting the video content item from a playback position that precedes the playback position included in the current playback session state (that is, preceding a playback position at which presentation of the video content item was stopped on the first display device). In such embodiments, the instructions can cause the second display device to begin presenting the video content item from a playback position that precedes the playback position included in the current playback session state by any suitable duration (e.g., three seconds, five seconds, and/or any other suitable duration) and/or number of frames (e.g., thirty frames, sixty frames, and/or any other suitable number).

Figure 4:
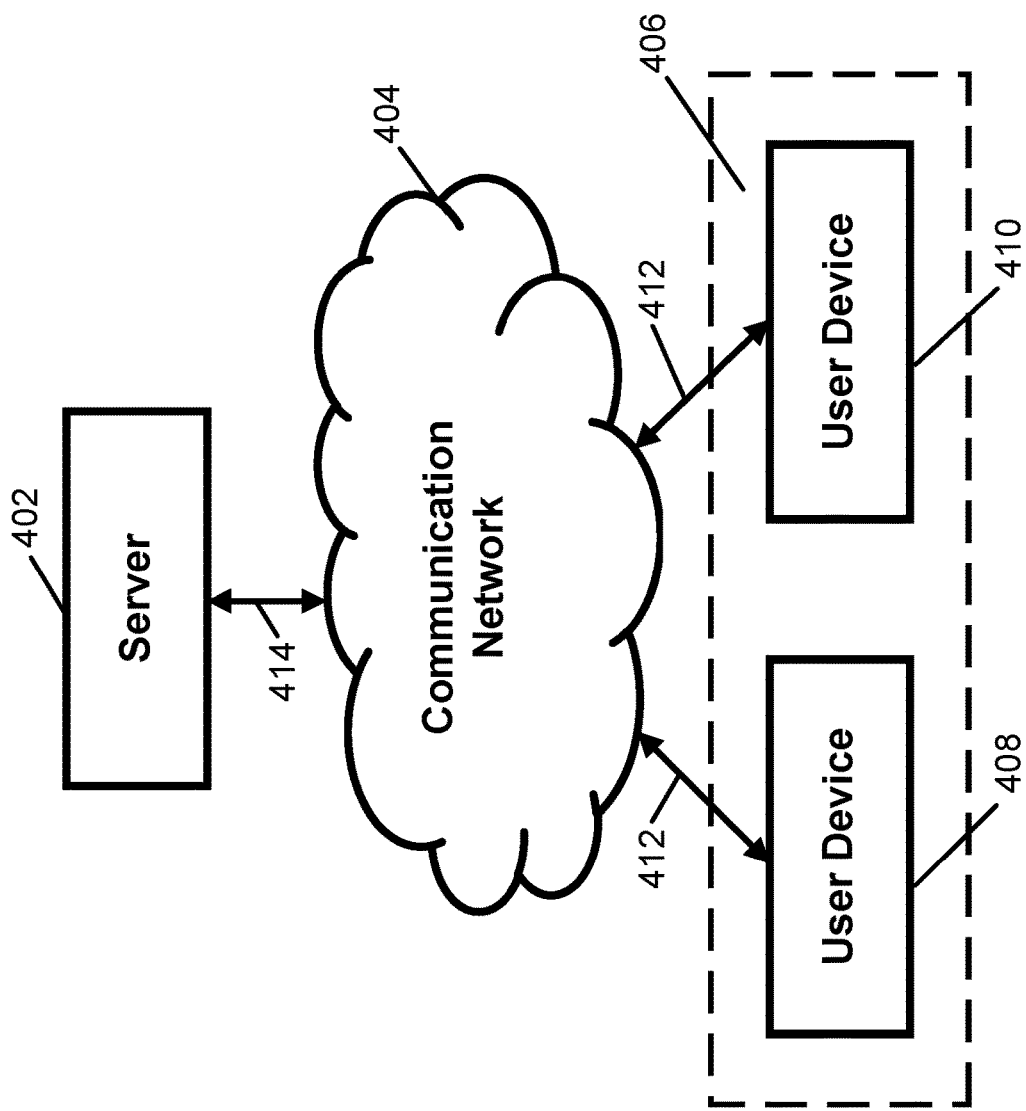
FIG. 4 shows a schematic diagram of an illustrative system suitable for implementation of mechanisms described herein for providing dynamic media sessions with video stream transfer features in accordance with some embodiments of the disclosed subject matter.

Turning to FIG. 4, a schematic diagram of an illustrative system 400 suitable for implementation of mechanisms described herein for providing dynamic media sessions with video stream transfer features that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for storing information, data, and/or media content. For example, in some embodiments, server 402 can be associated with a content casting service for storing information associated with any suitable cast sessions and/or any suitable devices grouped together in a cast session. In such embodiments, server 402 can transfer playback of a video content item from a first display device to a second display device, as shown in and described above in connection with FIG. 3. As another example, in some embodiments, server 402 can store media content items, which can be transmitted to user devices 406 for presentation. In such embodiments, the media content items can include any suitable types of media content, such as videos, movies, television programs, live-streamed content, audio content (e.g., music, audiobooks, radio programs, and/or any other suitable audio content), and/or any other suitable type of media content.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for presenting video content and/or audio content. For example, in some embodiments, user devices 406 can include speakers, a television, a media player, a game console, a mobile phone, a tablet computer, a desktop computer, a vehicle entertainment system, a wearable computer, and/or any other suitable type of user device.

In some embodiments, user device 406, such as a media presentation device or a media receiver device, can determine, via device discovery requests, that user devices 406 are multiple speakers within a particular proximity of user device 406 that have desirable audio playback capabilities in comparison with user device 406 having desirable video playback capabilities (e.g., a display having a particular resolution, a display having particular dimensions, etc.) and undesirable audio playback capabilities.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Figure 5:
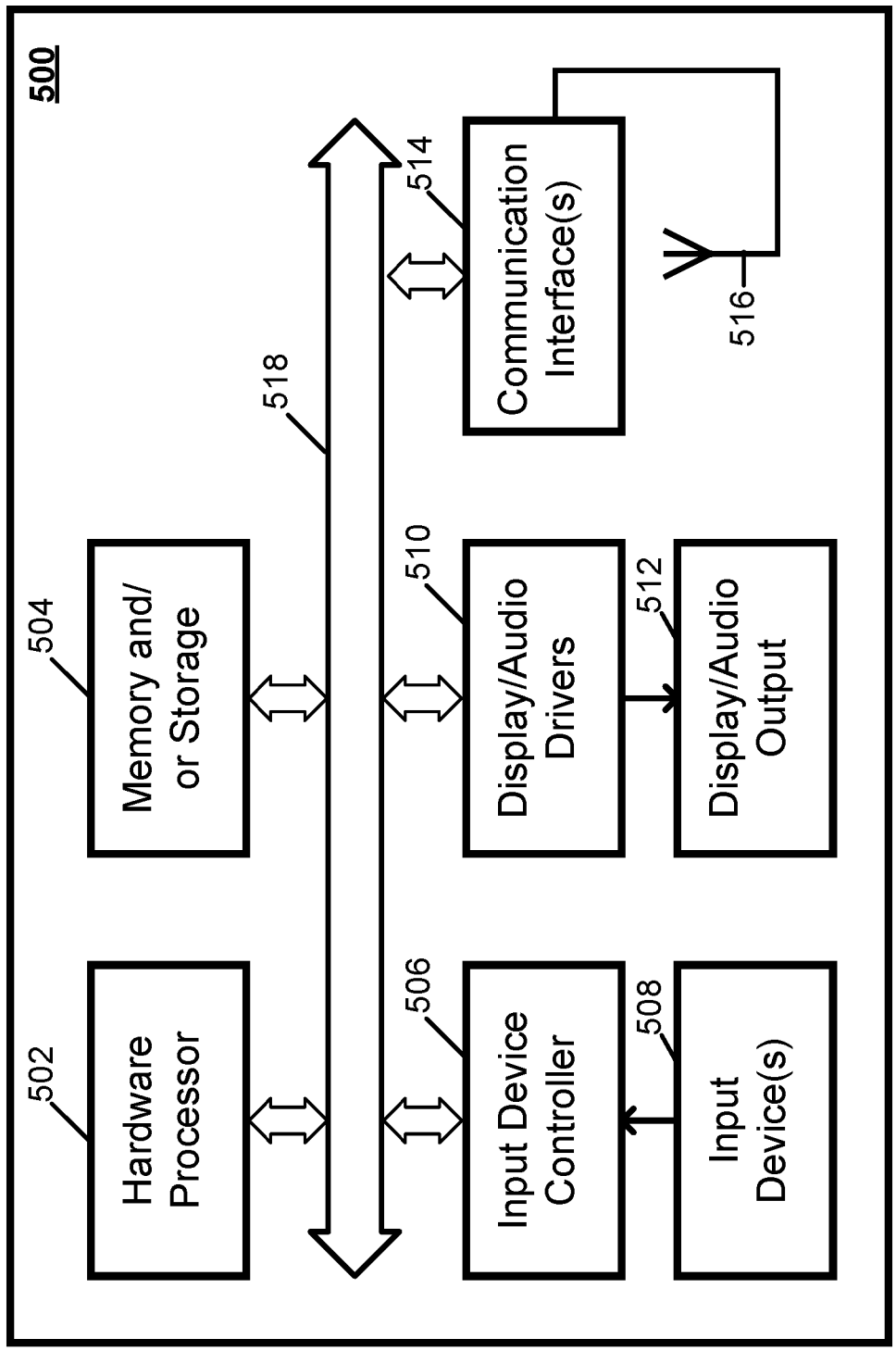
FIG. 5 shows a detailed example of hardware that can be used in a server and/or a user device of FIG. 4 in accordance with some embodiments of the disclosed subject matter.

Server 402 and user devices 406 can be implemented using any suitable hardware in some embodiments. For example, in some embodiments, devices 402 and 406 can be implemented using any suitable general purpose computer or special purpose computer. For example, a mobile phone may be implemented using a special purpose computer. Any such general purpose computer or special purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1 and 3 can be executed or performed in any order or sequence not limited to the order and sequence shown in and described in connection with the figures. Also, some of the above blocks of FIGS. 1 and 3 can be executed or performed substantially simultaneously where appropriate or in parallel to reduce latency and processing times. Additionally or alternatively, some of the above described blocks of the processes of FIGS. 1 and 3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for providing dynamic media sessions with video stream transfer features are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for media playback, the method comprising:
    causing, by a user device, a video content item to begin being presented on a first display device;
    determining a group of available devices within a particular proximity to the user device as having particular playback capabilities that are differentiated from one or more different playback capabilities, ordering available devices of the group of available devices according to proximity to the user device, and displaying an indication of the group of available devices in order of proximity to the user device, wherein the available devices comprise a different display device that is identified as closer to the user device than one or more others of the available devices;
    determining that a first media playback application used to present the video content item on the first display device supports a stream transfer of the video content item in which the first display device is capable of being removed as a device that presents the video content item;
    determining that the different display device has a second media playback application that is capable of receiving the stream transfer of the video content item;
    transmitting, from the user device to a server, an indication that a stream of the video content item is to be transferred from the first display device to the different display device based on the determination that the first media playback application used to present the video content item on the first display device supports the stream transfer of the video content item;
    requesting, by the server, a playback state from the first display device, where the playback state comprises an indication of a first playback position that corresponds to the presentation of the video content item on the first display device; and
    transmitting, by the server to the different display device, the playback state to the different display device in connection with an instruction to load the second media playback application on the different display device to present the video content item and to use the second media playback application to begin presenting the video content item from a second playback position that precedes the first playback position.

2. The method of claim 1, wherein each display device in the group of available devices is connected to a local area network and the method further comprises:
    causing a user interface to be presented on the user device that indicates display devices included in the group of available devices; and
    receiving, at the user device, a selection of one of the display devices from the available devices.

3. The method of claim 2, further comprising presenting a second user interface on the user device during presentation of the video content item on the first display device for controlling playback of the video content item on the first display device.

4. The method of claim 3, further comprising presenting the second user interface on the user device during presentation of the video content item on the selected display device, wherein the second user interface is updated to indicate an identity of the selected display device.

5. The method of claim 3, wherein the second user interface includes a selectable icon that, when selected, causes the user interface that indicates display devices included in the group of available devices to be presented on the user device.

6. The method of claim 2, wherein the selected display device is the user device.

7. The method of claim 6, further comprising initializing, on the user device, the second media playback application for presenting the video content item in response to receiving the selection of the display device.

8. The method of claim 1, wherein the second media playback application is a second instance of the first media playback application, and the server causes the different display device to execute the second instance of the first media playback application, and wherein the second instance of the first media playback application receives the playback state for resuming playback of the video content item.

9. The method of claim 1, wherein the indication that the stream of the video content item is to be transferred from the first display device to the different display device is received via a voice command.

10. A system for media playback, the system comprising:
    a hardware processor that:
        causes, by a user device, a video content item to begin being presented on a first display device;
        determines a group of available devices within a particular proximity to the user device as having particular playback capabilities that are differentiated from one or more different playback capabilities, ordering available devices of the group of available devices according to proximity to the user device, and displaying an indication of the group of available devices in order of proximity to the user device, wherein the available devices comprise a different display device that is identified as closer to the user device than one or more others of the available devices;
        determining that a first media playback application used to present the video content item on the first display device supports a stream transfer of the video content item in which the first display device is capable of being removed as a device that presents the video content item;
        determining that the different display device has a second media playback application that is capable of receiving the stream transfer of the video content item;
        transmits, from the user device to a server, an indication that a stream of the video content item is to be transferred from the first display device to the different display device based on the determination that the first media playback application used to present the video content item on the first display device supports the stream transfer of the video content item;

requests, by the server, a playback state from the first display device, where the playback state comprises an indication of a first playback position that corresponds to the presentation of the video content item on the first display device; and transmits, by the server to the different display device, the playback state to the different display device in connection with an instruction to load the second media playback application on the different display device to present the video content item and to use the second media playback application to begin presenting the video content item from a second playback position that precedes the first playback position.

11. The system of claim 10, wherein each display device in the group of available devices is connected to a local area network and the hardware processor also:

causes a user interface to be presented on the user device that indicates display devices included in the group of available devices; and receives, at the user device, a selection of one of the display devices from the available devices.

12. The system of claim 11, wherein the hardware processor also causes presentation of a second user interface on the user device during presentation of the video content item on the first display device for controlling playback of the video content item on the first display device.

13. The system of claim 12, wherein the causing presentation of the second user interface on the user device is during presentation of the video content item on the selected display device, wherein the second user interface is updated to indicate an identity of the selected display device.

14. The system of claim 12, wherein the second user interface includes a selectable icon that, when selected, causes the user interface that indicates display devices included in the group of available display devices to be presented on the user device.

15. The system of claim 11, wherein the selected display device is the user device.

16. The system of claim 15, wherein the hardware processor also initializes, on the user device, the second media playback application for presenting the video content item in response to receiving the selection of the display device.

17. The system of claim 10, wherein the second media playback application is a second instance of the first media playback application, and the server causes the different display device to execute the second instance of the first media playback application, and wherein the second instance of the first media playback application receives the playback state for resuming playback of the video content item.

18. The system of claim 10, wherein the indication that the stream of the video content item is to be transferred from the first display device to the different display device is received via a voice command.

19. A non-transitory, computer-readable medium containing computer executable instructions that, when executed by a processor, cause the processor to perform a method for media playback, the method comprising:

causing, by a user device, a video content item to begin being presented on a first display device;

determining a group of available devices within a particular proximity to the user device as having particular playback capabilities that are differentiated from one or more different playback capabilities, ordering available devices of the group of available devices according to proximity to the user device, and displaying an indication of the group of available devices in order of proximity to the user device, wherein the available devices comprise a different display device that is identified as closer to the user device than one or more others of the available devices;

determining that a first media playback application used to present the video content item on the first display device supports a stream transfer of the video content item in which the first display device is capable of being removed as a device that presents the video content item;

determining that the different display device has a second media playback application that is capable of receiving the stream transfer of the video content item;

transmitting, from the user device to a server, an indication that a stream of the video content item is to be transferred from the first display device to the different display device based on the determination that the first media playback application used to present the video content item on the first display device supports the stream transfer of the video content item;

requesting, by the server, a playback state from the first display device, where the playback state comprises an indication of a first playback position that corresponds to the presentation of the video content item on the first display device; and transmitting, by the server to the different display device, the playback state to the different display device in connection with an instruction to load the second media playback application on the different display device to present the video content item and to use the second media playback application to begin presenting the video content item from a second playback position that precedes the first playback position.

* * * * *